United States Patent
Han

(10) Patent No.: US 11,319,213 B2
(45) Date of Patent: May 3, 2022

(54) MESOPOROUS SILICA EMBEDDED WITH ALLOY PARTICLES AND PREPARATION METHOD THEREOF

(71) Applicants: CEN CO., LTD, Busan (KR);
CENNANO CO., LTD, Busan (KR);
CENBIO CO., LTD, Yangsan-si (KR)

(72) Inventor: Sang Cheol Han, Busan (KR)

(73) Assignees: CEN CO., LTD, Busan (KR);
CENNANO CO., LTD, Busan (KR);
CENBIO CO., LTD, Yangsan-si (KR)

( * ) Notice: Subject to any disclaimer, the term of this patent is extended or adjusted under 35 U.S.C. 154(b) by 120 days.

(21) Appl. No.: 16/702,472

(22) Filed: Dec. 3, 2019

(65) Prior Publication Data

US 2020/0247679 A1 Aug. 6, 2020

(51) Int. Cl.
*C01B 33/18* (2006.01)
*C04B 41/88* (2006.01)
*C01G 5/00* (2006.01)

(52) U.S. Cl.
CPC .............. *C01B 33/181* (2013.01); *C01G 5/00* (2013.01); *C04B 41/88* (2013.01)

(58) Field of Classification Search
CPC ......... B82Y 30/00; C22C 38/04; C22C 38/02; C22C 38/10; C22C 38/12; C22C 38/14; C22C 38/24; C22C 38/28; C22C 38/30; C22C 38/08; C22C 5/04; C22C 2202/02; C22C 5/02; C22C 1/08; C22C 18/00; C22C 19/03; C22C 38/06; C22C 5/00; C22C 5/06; C01B 33/181; B01J 23/50; B01J 23/48; B01J 23/42; B01J 37/0201;
(Continued)

(56) References Cited

FOREIGN PATENT DOCUMENTS

| CN | 101024246 A | 8/2007 |
| CN | 105251480 A | 1/2016 |

(Continued)

OTHER PUBLICATIONS

Li et al (Formation Combined with Intercalation of Ni and Its Alloy Nanoparticles within Mesoporous Silica for Robust Catalytic Reactions, ACS Applied Materials and Interfaces, Aug. 18, 2018) (Year: 2018).*

(Continued)

*Primary Examiner* — Anthony J Zimmer
*Assistant Examiner* — Logan Edward Laclair
(74) *Attorney, Agent, or Firm* — STIP Law Group, LLC

(57) ABSTRACT

The present invention relates to mesoporous silica embedded with alloy particles, and a preparation method thereof, and it is possible to prevent the release of metal particles to the outside because the inside of spherical mesoporous silica is embedded with metal nanoparticles, and as the aggregation of the metal is prevented, the stability is excellent and the production yield is high during the preparation process, so that mesoporous silica can be mass-produced, the efficacy of metal nanoparticles may be maintained by preventing the oxidation of metal nanoparticles, and mesoporous silica can be produced at low costs.

Further, the inside of pores of mesoporous silica is embedded with metal nanoparticles, so that the discoloration and smell change phenomenon does not occur, and the far-infrared emission and deodorization effects are excellent.

10 Claims, 15 Drawing Sheets

(58) Field of Classification Search
CPC .......... B01J 20/28083; B01J 2523/828; B01J 2531/005; B01J 21/12
See application file for complete search history.

(56) References Cited

FOREIGN PATENT DOCUMENTS

| | | | | |
|---|---|---|---|---|
| EP | 2559661 | A1 | 2/2013 | |
| JP | 2003055703 | A | 2/2003 | |
| JP | 2004099386 | A | 4/2004 | |
| JP | 2014043381 | A | 3/2014 | |
| KR | 100438408 | B1 * | 7/2004 | .............. A61P 35/00 |
| KR | 20070068871 | A * | 7/2007 | |
| KR | 100806915 | B1 | 2/2008 | |

OTHER PUBLICATIONS

L. Alvarez-Contreras et al, Synthesis of Pt—Sn core-shell nanoparticles deposited on SBA-15 modified, Journal of Nanoparticle Research, Jun. 27, 2013, pp. 1-9, vol. 15, 1799, Springer, New York, USA.

Kenji Okitsu et al, Catalytic Behavior of Au Core / Pd Shell Bimetallic Nanoparticles on Silica Prepared by Sonochemical and Sol-Gel Processes, Chemistry Letters, Sep. 5, 2000, pp. 1336-1337, vol. 29, The Chemical Society of Japan, Tokyo, Japan.

L. Alvarez-Contreras et al, Synthesis of Pt—Sn core-shell nanoparticles deposited on SBA-15 modified, J Nanopart Res, Jun. 27, 2013, vol. 15, issue 1799, pp. 1-9, Springer Science Business Media Dordrecht, Berlin, Germany.

Xiaoyan Liu et al, Au—Cu Alloy nanoparticles confined in SBA-15 as a highly efficient catalyst for CO oxidation, ChemComm, 2008, pp. 3187-3189, The Royal Society of Chemistry, London, United Kingdom.

* cited by examiner

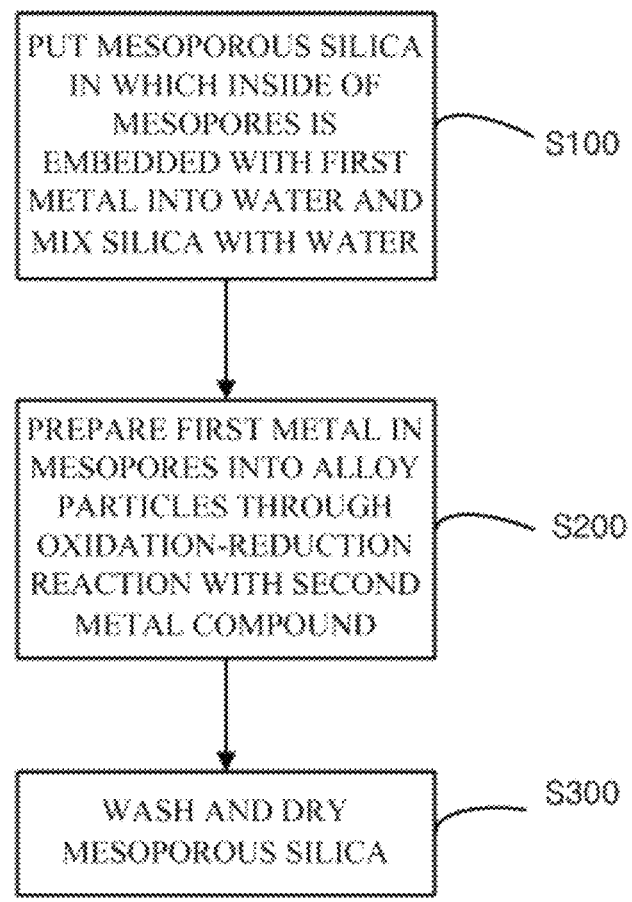
[FIG. 1]

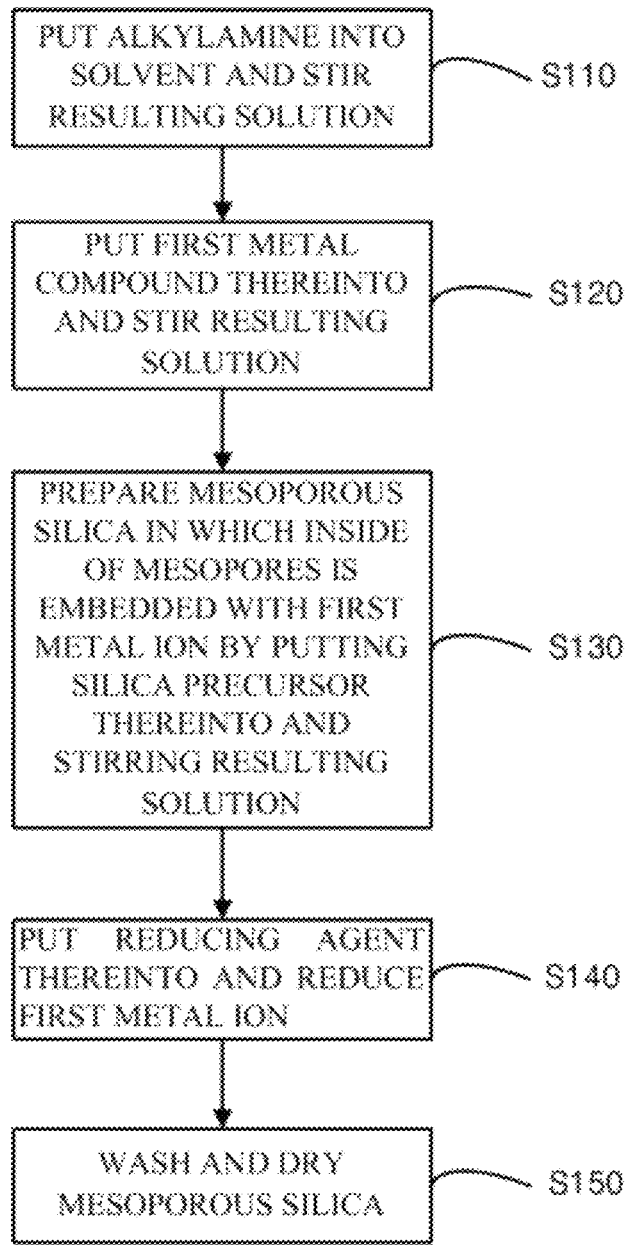

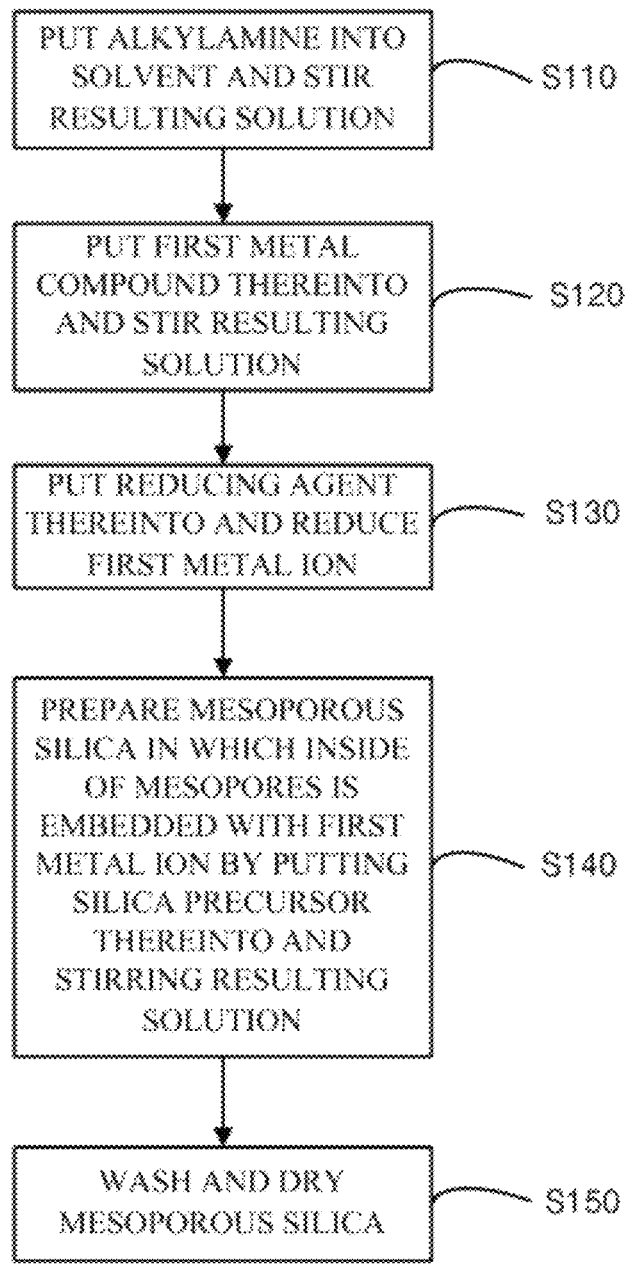

[FIG. 4]
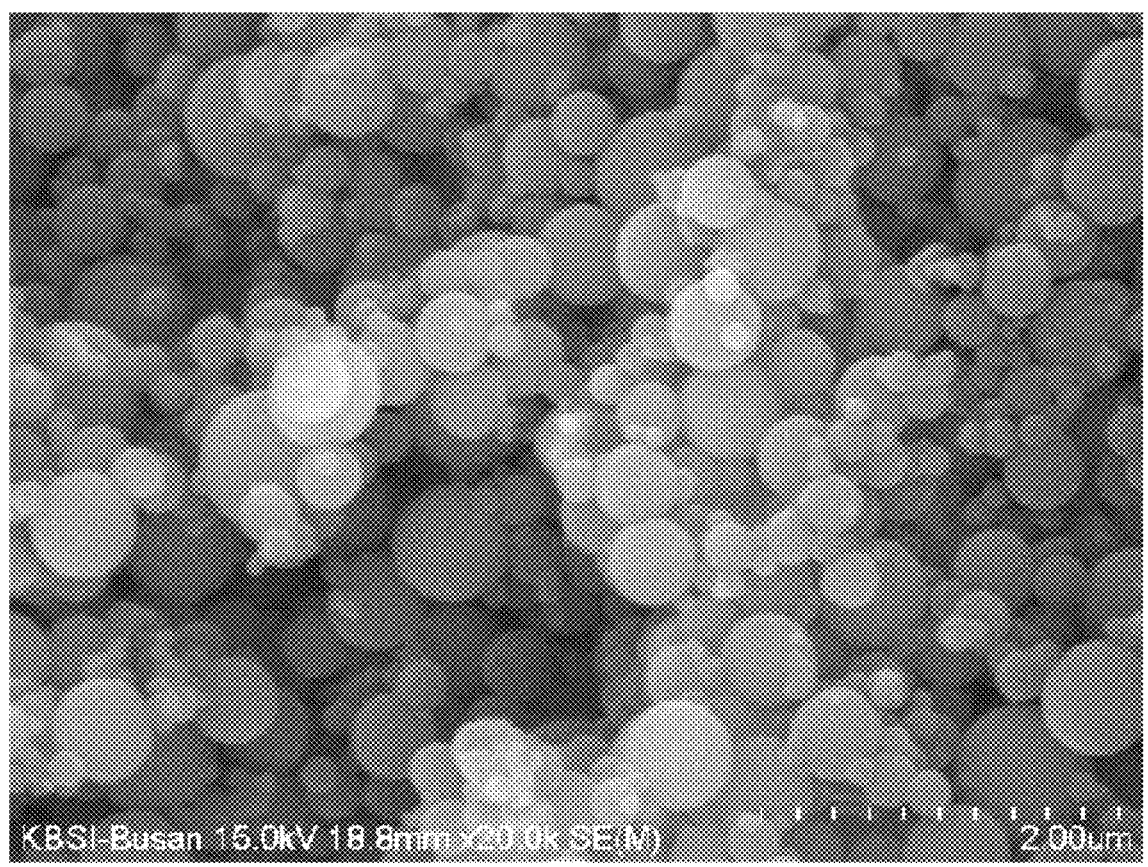

[FIG. 5]
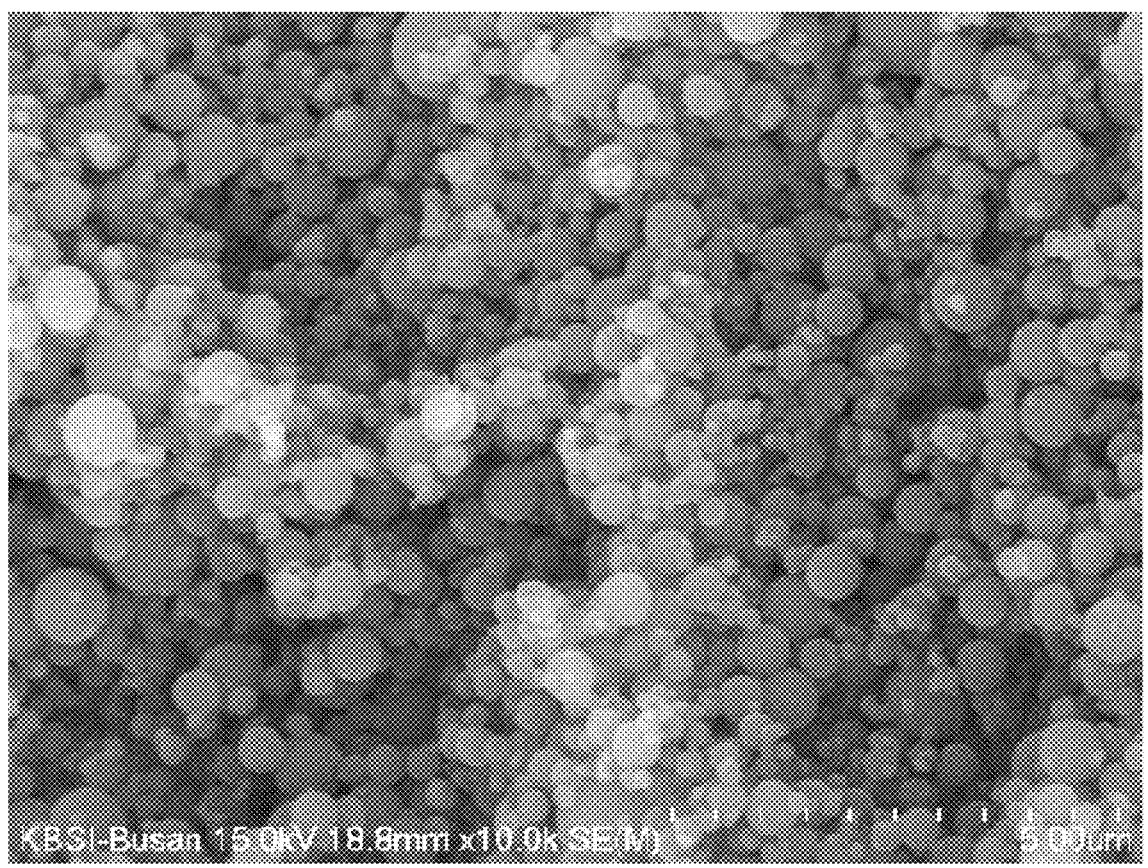

[FIG. 6]
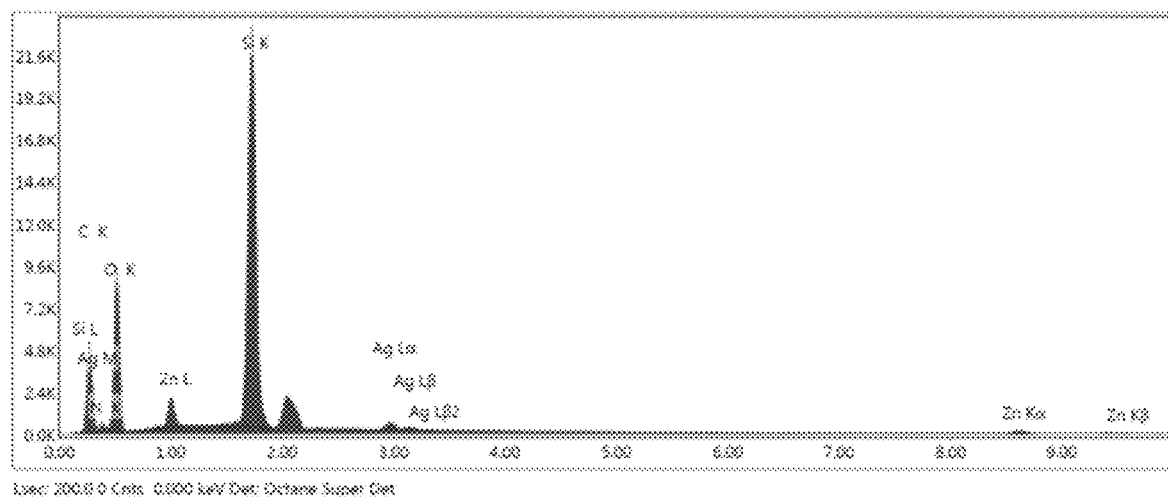

[FIG. 7]
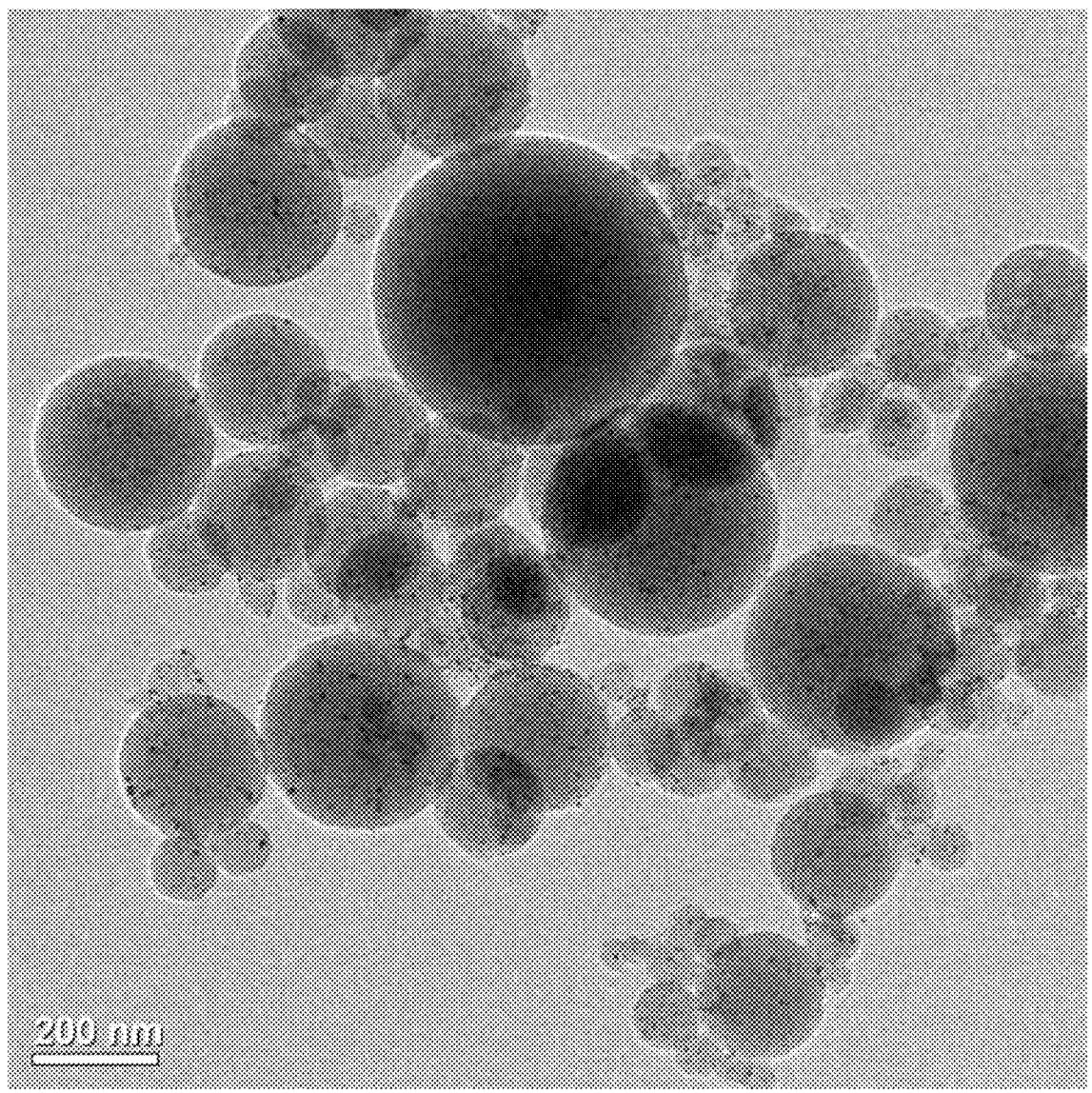

[FIG. 8]
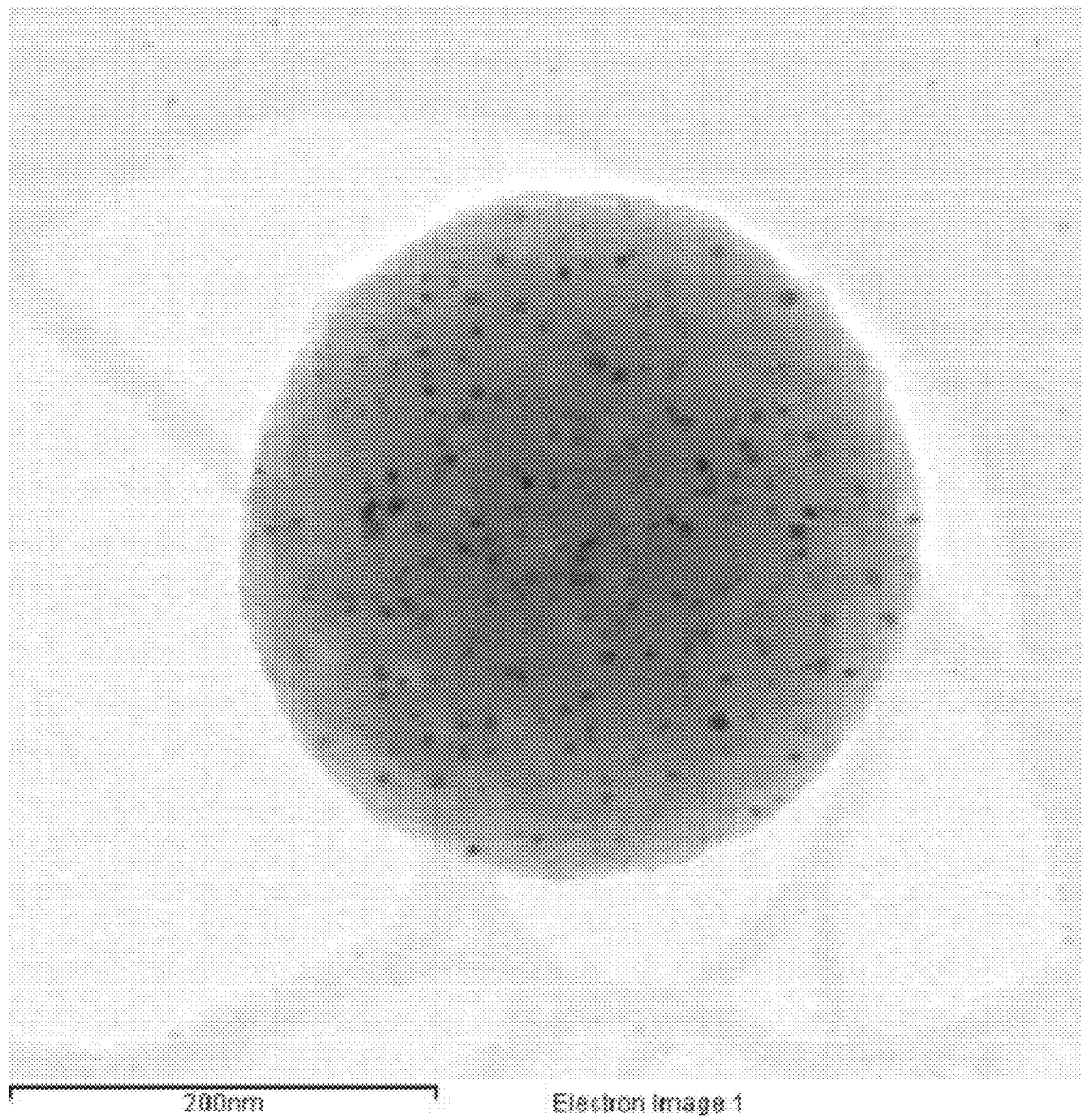

[FIG. 9]
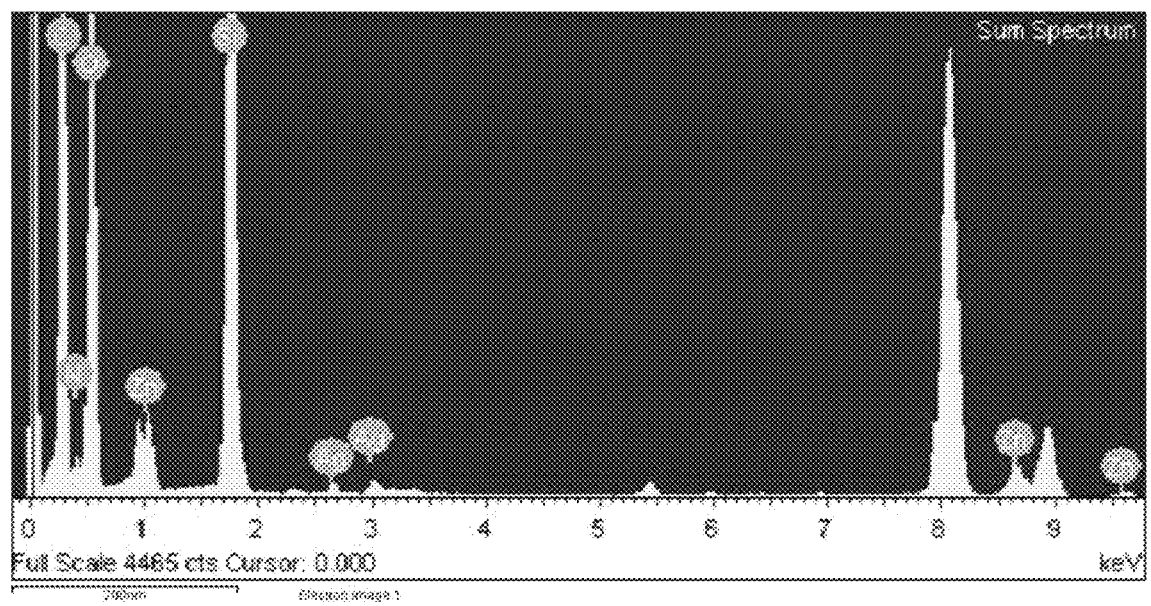
[FIG. 10]
| Element | Weight % | Atomic % |
|---|---|---|
| C K | 38.58 | 51.63 |
| N K | 1.91 | 2.19 |
| O K | 30.84 | 30.99 |
| Si K | 25.32 | 14.49 |
| Zn K | 2.09 | 0.51 |
| Ag L | 1.27 | 0.19 |
| Totals | 100.00 | |

[FIG. 11]
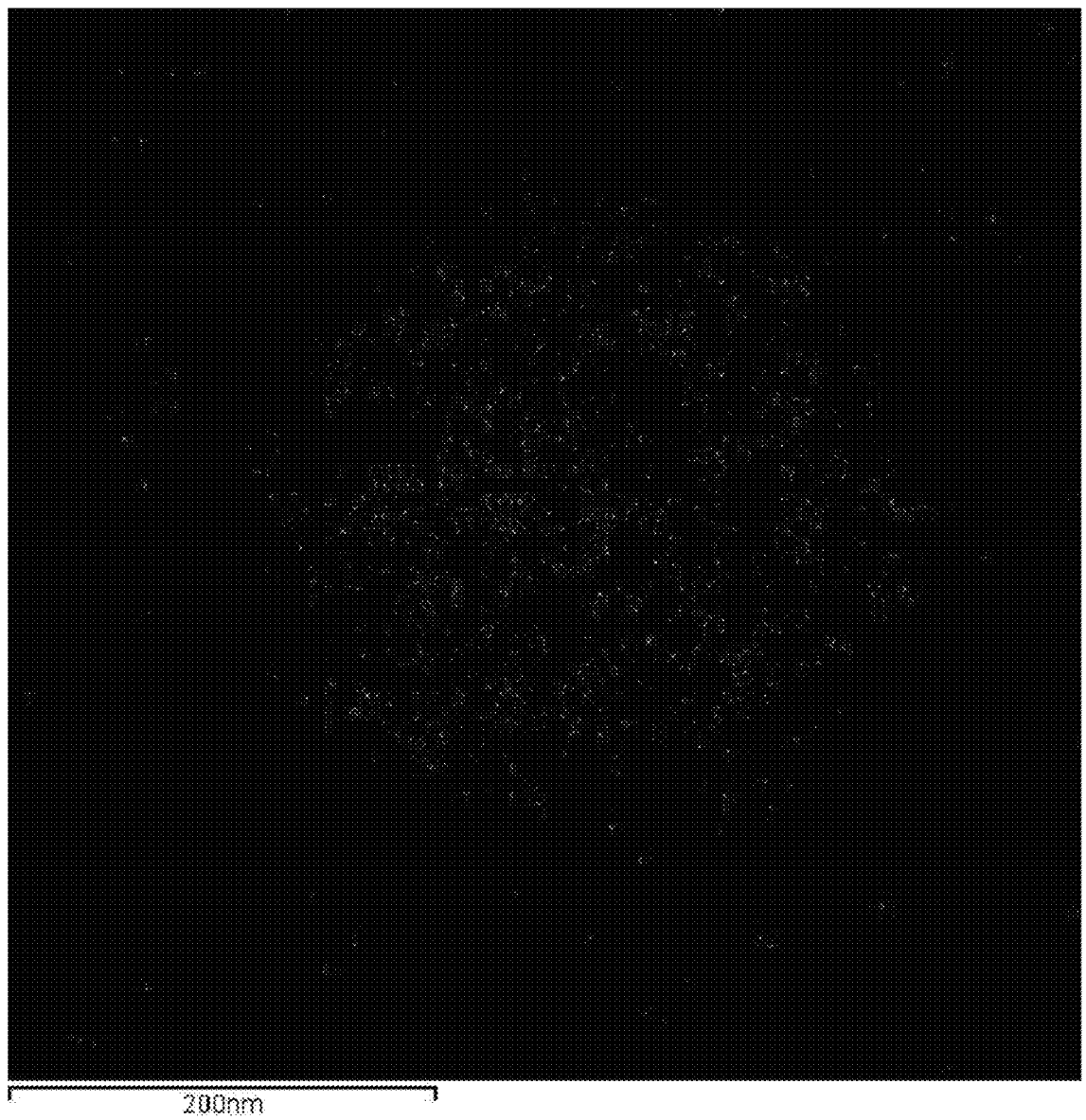

[FIG. 12]
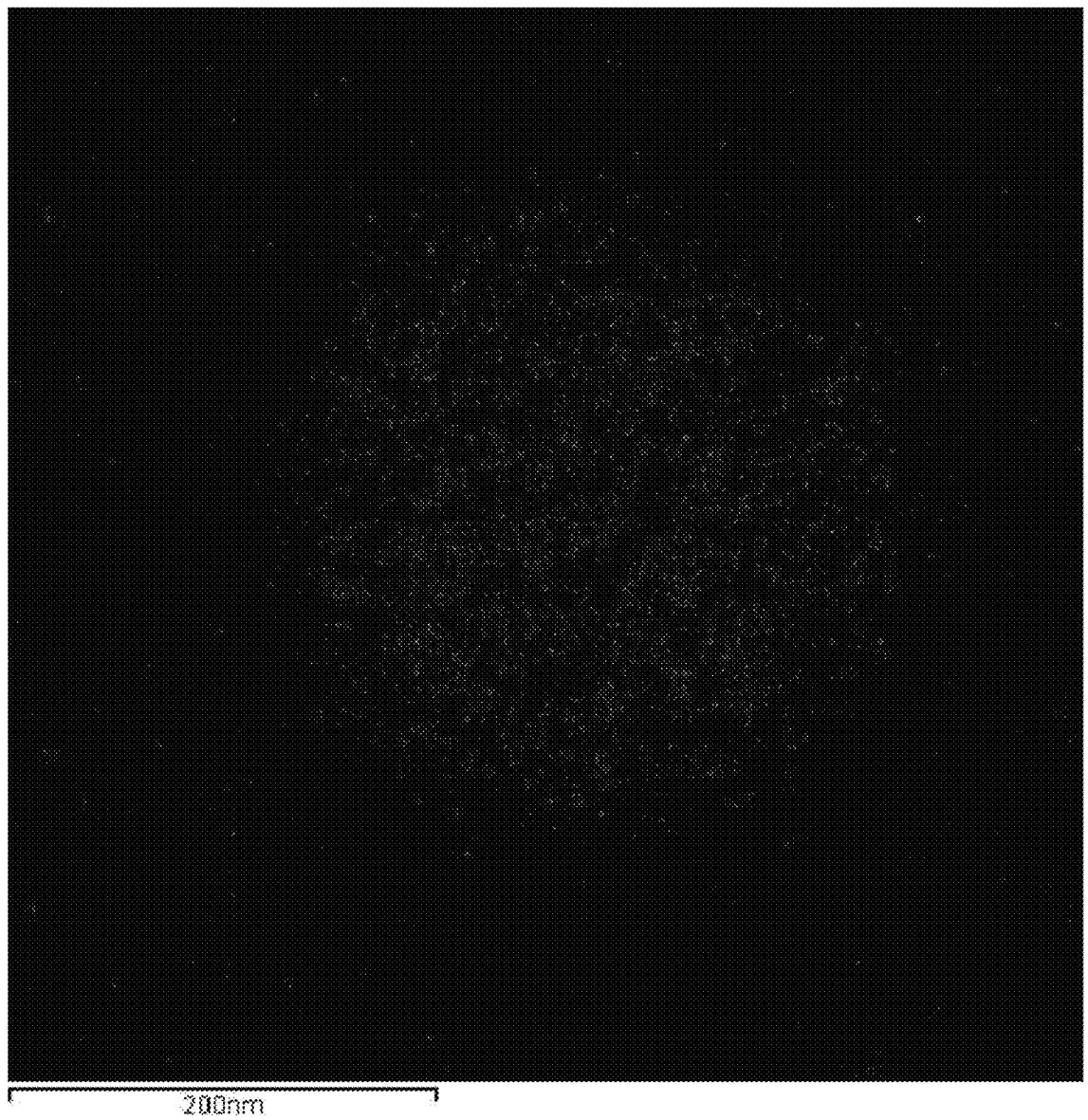

[FIG. 13]
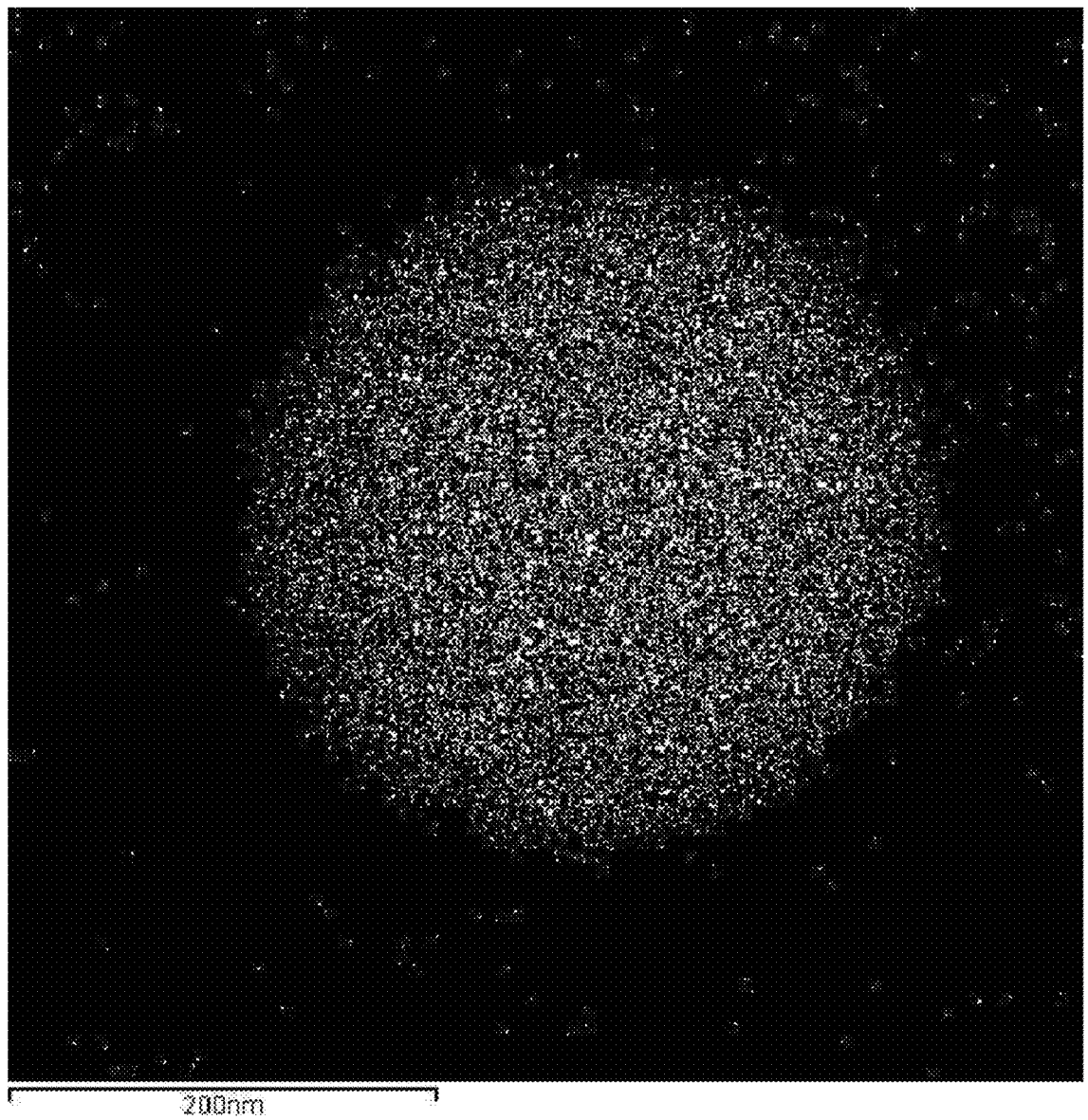

[FIG. 14]
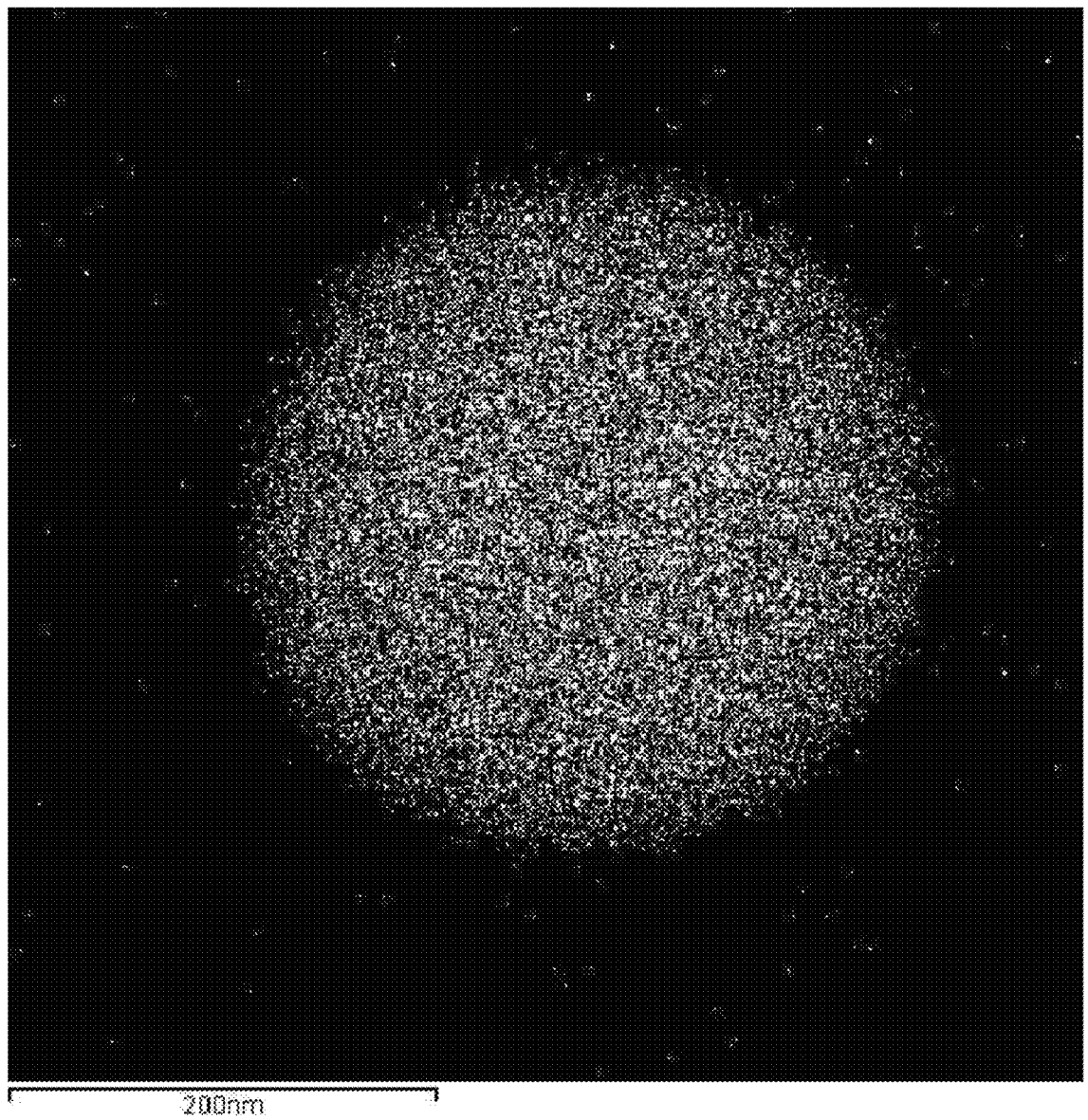

[FIG. 15]
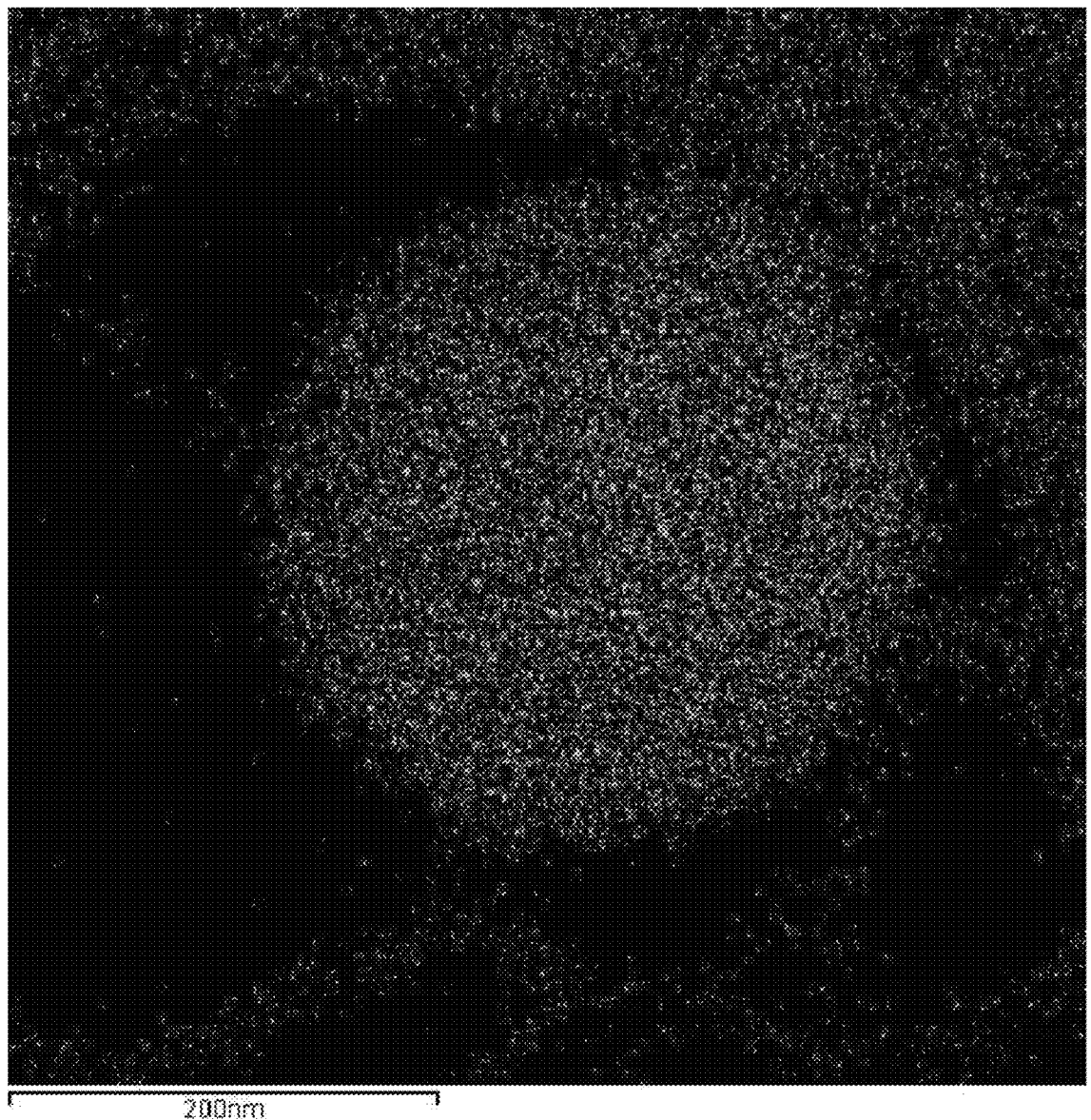

[FIG. 16]
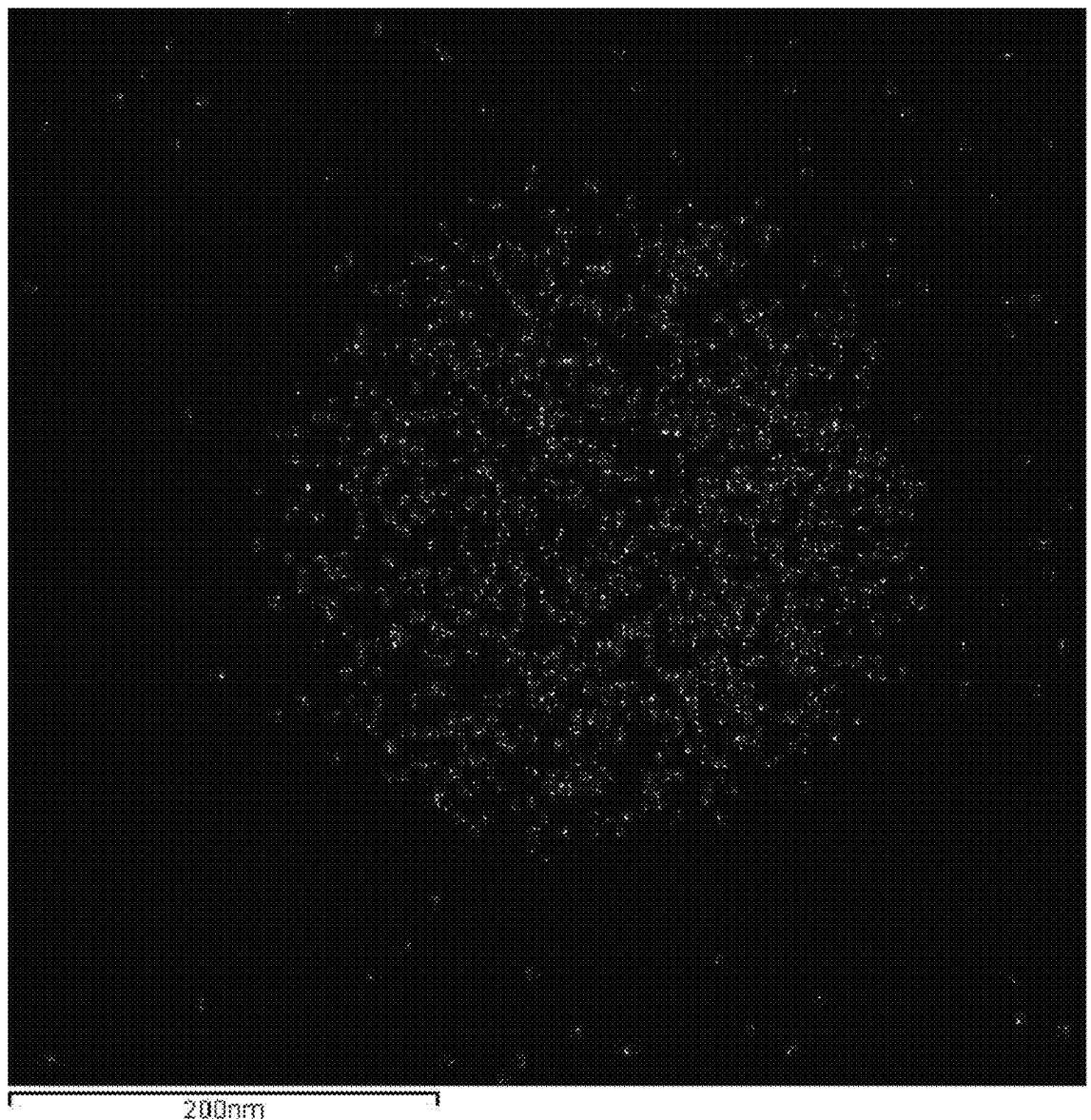

MESOPOROUS SILICA EMBEDDED WITH ALLOY PARTICLES AND PREPARATION METHOD THEREOF

CROSS-REFERENCE TO RELATED APPLICATIONS

This application claims priority to and the benefit of Korean Patent Application No. 10-2019-0101556 and No. 10-2019-0013640 filed in the Korean Intellectual Property Office on Feb. 1, 2019, the entire contents of which are incorporated herein by reference.

TECHNICAL FIELD

The present invention relates to mesoporous silica embedded with alloy particles and a preparation method thereof, and more particularly, to mesoporous silica embedded with alloy particles, in which stability is excellent and discoloration and smell change do not occur, and a preparation method thereof.

BACKGROUND ART

A synthesis method of mesoporous silica has been mainly a synthesis method using a surfactant. According to the method of interaction between a surfactant and silica, the acidity control such as acidity, basicity and neutrality is an important factor in the synthesis conditions.

SBA-based mesoporous silica synthesized under acidic conditions has excellent thermal stability compared to other mesoporous silicas and thus has been widely applied to catalytic reactions.

Among them, SBA-16 mesoporous silica synthesized as F127 has 3-D porous channels to facilitate the inflow and outflow of material, and many studies for utilizing SBA-16 mesoporous silica as a catalyst have been conducted. In particular, aluminum-substituted mesoporous silica shows Lewis acidity, and can be utilized in Lewis acid catalysis reactions.

Unlike zeolite having micropores, mesoporous silica does not contain aluminum, and thus almost has no catalyst active points, so that an active point needs to be introduced in order to utilize mesoporous silica as a catalyst. Although many studies for introducing active points into mesoporous silica have been conducted, mesoporous silica is synthesized under acidic conditions, so that when a metal is meant to be introduced, the metal is present in an ionic state, and thus it is difficult to achieve a method for synthesizing mesoporous silica by directly putting the metal into mesoporous silica during the synthesis process.

Although methods for putting a metal into mesopores have been studied to date, a method of synthesizing mesoporous silica, and then putting a metal has been used because it is difficult to directly synthesize mesoporous silica. Such a post-treatment method results in reduction in reusability of a catalyst because a metal is released from the catalyst during the reuse of the catalyst.

Although metal nanoparticles have been recently applied to various industrial fields due to catalytic characteristics and efficacies such as bactericidal power and deodorizing power, reports on problems that nanoparticle materials are absorbed in vivo through the skin tissue or respiratory system, and thus cause damage to the human body have been published, so that there is a problem with stability caused by the use of nanoparticle materials.

In particular, as a silver nanoparticle preparation technology, a method of preparing silver nanoparticles in colloidal form or preparing silver nanoparticles using plasma has been generally known, but there is a high-cost problem because conditions for making silver nanoparticles nano-sized from the time when the particles are synthesized need to be newly implemented, and there is also a problem in that the dispersion force deteriorates or the aggregation phenomenon strongly occurs, and thus it is difficult to deal with silver nanoparticles.

Although silver is generally known to be innocuous to the human body in terms of stability, recent data have reported that silver is eluted or absorbed by the human body, and thus silver poisoning occurs, and silver causes the skin tissue to turn gray, and the stability problem of silver nanomaterials has often been mentioned.

As there has been concern about the aforementioned problems, a technology of a method for carrying out reactions by adsorbing or bonding metal nanoparticles to another material has been developed as a method of enhancing the dispersibility of the metal nanoparticles.

However, even the technology for improving the dispersibility, has a problem in that the metal powder is released during the preparation process, the bonding power remarkably deteriorates, and thus, stability is not secured in terms of preparation method.

To solve these problems, as a method of carrying out reactions by adsorbing or bonding metal nanoparticles to another material to enhance the dispersibility of metal nanoparticles, there is a need for developing a technology which does not incur a problem of releasing metal nanoparticles to the outside during the preparation process, is excellent in bonding power, and thus can secure stability.

PRIOR ART DOCUMENT

Patent Document (Patent Document 1) KR 10-0806915 B1

SUMMARY OF THE INVENTION

The present invention has been made in an effort to provide mesoporous silica embedded with alloy particles and a preparation method thereof.

The present invention has also been made in an effort to provide mesoporous silica embedded with alloy particles, in which the stability is excellent as the inside of the spherical mesoporous silica can be embedded with metal nanoparticles to prevent the metal from being released to the outside and the aggregation of the metal is prevented, and a preparation method thereof.

The present invention has also been made in an effort to provide mesoporous silica embedded with alloy particles, in which the inside of pores of mesoporous silica is embedded with metal nanoparticles, the discoloration and smell change phenomenon does not occur and the far-infrared emission and deodorization effects are excellent, and a preparation method thereof.

The present invention has also been made in an effort to provide meso porous silica embedded with alloy particles, which can be mass-produced due to the high production yield during the preparation process, may maintain the efficacy of metal nanoparticles by preventing oxidation of metal nanoparticles, and can be produced at a low cost, and a preparation method thereof.

In order to achieve the objects, the mesoporous silica embedded with alloy particles according to an exemplary embodiment of the present invention is mesoporous silica, in which the inside of mesopores of the silica is embedded with metal particles, and the metal particle may include an alloy particle having a core-shell structure.

The mesoporous silica is spherical.

The alloy particle has a core-shell structure, in which the metal constituting the core may have an ionization tendency higher than that of the metal constituting the shell.

The metal constituting the core may be selected from the group consisting of lithium (Li), magnesium (Mg), aluminum (Al), manganese (Mn), zinc (Zn), chromium (Cr), iron (Fe), cobalt (Co), nickel (Ni), tin (Sn), and a mixture thereof.

The metal constituting the shell may be selected from the group consisting of copper (Cu), silver (Ag), platinum (Pt), palladium (Pd), and a mixture thereof.

The method for preparing the mesoporous silica embedded with alloy particles according to another exemplary embodiment of the present invention may include: 1) putting mesoporous silica in which the inside of mesopores is embedded with a first metal into water and mixing the silica with the water; 2) putting a second metal compound into the mixed solution and preparing the first metal in the mesopores into alloy particles having a core-shell structure through an oxidation-reduction reaction with the first metal; and 3) washing and drying the mesoporous silica.

The preparing of the mesoporous silica in which the inside of the mesopores is embedded with the first metal may include: a) putting alkylamine into a solvent and stirring the resulting solution; b) preparing a solution containing a first metal ion by putting the first metal compound into the solution in step a) and stirring the resulting solution; c) preparing mesoporous silica in which the inside of the mesopores is embedded with the first metal ion by putting a silica precursor into the solution containing the first metal ion and stirring the resulting solution; d) putting a reducing agent into the solution in step 3) and reducing the first metal ion; and e) washing and drying the mesoporous silica.

The preparing of the mesoporous silica in which the inside of the mesopores is embedded with the first metal may include: a') putting alkylamine into a solvent and stirring the resulting solution; b') preparing a solution containing a first metal ion by putting the first metal compound into the solution in step a') and stirring the resulting solution; c') putting a reducing agent into the solution in step b') and reducing the first metal ion; d') preparing mesoporous silica in which the inside of the mesopores is embedded with the first metal by putting a silica precursor into the solution in which the first metal ion is reduced and stirring the resulting solution; and e') washing and drying the mesoporous silica.

The first metal may be selected from the group consisting of lithium (Li), magnesium (Mg), aluminum (Al), manganese (Mn), zinc (Zn), chromium (Cr), iron (Fe), cobalt (Co), nickel (Ni), tin (Sn), and a mixture thereof.

The second metal compound may be selected from the group consisting of $AgNO_3$, $CuCl_2$, $Pt(OAC)_2$, $PdCl_2$, $AgNO_3$, $Au(OAc)_3$, and a mixture thereof.

Hereinafter, the present invention will be described in more detail.

The mesoporous silica of the present invention generally means silica having a pore size of 2 to 50 nm.

In the mesoporous silica of the present invention, the inside of mesopores of the silica is embedded with metal particles, and the metal particles may include alloy particles having a core-shell structure.

The mesoporous silica is spherical, pores thereof are formed, and thus the inside of the pores is embedded with metal particles, and some of the metal particles may be included in a form in which the inside of the pores are embedded with the alloy particles having a core-shell structure.

The metal particles constituting the core are characterized to have an ionization tendency higher than that of the metal particles constituting the shell.

When the ionization tendency of the metal particles constituting the core is higher than that of the metal particles constituting the shell, oxidation of the shell metal may be prevented by the core metal.

That is, the ionization tendency means the degree of ease of oxidation, and a metal having high ionization tendency may mean that oxidation may easily occur as compared to a metal having a low ionization tendency.

Since the mesoporous silica has various-sized pores, a high specific surface area, and a high pore volume, the mesoporous silica may be used for a wide range of uses, such as a catalyst, an adsorbent, a low dielectric material, and separation and purification processes, and may be usefully used as a template for preparing new porous materials such as porous carbon.

When the inside of mesopores is embedded with metal particles as in the present invention, it is possible to exhibit bactericidal and deodorization effects caused by metal particles within the use for which the mesoporous silica is used.

However, when metal particles with which the inside of the mesoporous silica is embedded are composed of only single metal particle, as the mesoporous silica is used, metal particles are oxidized, and as a result, when the metal particles themselves react as an oxide, there may occur a problem in that the effects caused by the metal particles deteriorate.

Thus, as the present invention includes the metal particles with which the inside of the mesoporous silica is embedded in the form of alloy particles having a core-shell structure, it is possible to exhibit the effects caused by the metal, and simultaneously to prevent oxidation of the shell metal by the core metal as the shell metal is exposed to the outside.

That is, as the mesoporous silica is used, it is possible to exhibit effects of emitting the far-infrared ray of silica, and the like, and simultaneously exhibit the effects caused by the metal particles with which the inside of mesopores is embedded, so that the present invention can exceed the utilization range of the existing mesoporous silica, and can be applied to more diverse fields.

However, due to the oxidation of metal particles, there may occur a problem in that when the metal particles react as an oxide, the effects caused by the use of the metal are reduced.

In the related art, a technology in which the inside of mesoporous silica is embedded with metal particles by various methods is published, but the effects caused by the use of metal particles may be exhibited because the corresponding metal particles are composed of only a single metal and metal particles having a very high ionization tendency are generally used, but when the metal particles are exposed to the air depending on the used state, there is a problem in that due to the oxidation of metal particles, the effects caused by the inside of mesoporous silica embedded with metal particles are insignificant.

In order to prevent these problems, the present invention may prevent oxidation of metal particles constituting the shell by using two or more metal nanoparticles having different ionization tendency to embed the inside of mesoporous silica with a core-shell structure, thereby preventing oxidation of metal particles even when the silica is used for a long period of time.

The metal constituting the core may be selected from the group consisting of lithium (Li), magnesium (Mg), aluminum (Al), manganese (Mn), zinc (Zn), chromium (Cr), iron (Fe), cobalt (Co), nickel (Ni), tin (Sn), and a mixture thereof, and preferably, the metal is zinc, but is not limited to the above example, and can be used without limitation as long as the metal can prevent oxidation of the metal constituting the shell.

The metal constituting the shell may be selected from the group consisting of copper (Cu), silver (Ag), platinum (Pt), palladium (Pd), and a mixture thereof. Preferably, the metal is silver, but is not limited to the above example, and can be used without limitation according to the utilization state of the mesoporous silica.

However, when a metal applied to the shell structure is selected due to the characteristics of the core-shell structure, as a metal applied to the core structure, it is preferred to use a metal having an ionization tendency higher than that of the metal constituting the shell.

Various core-shell metal combinations may be obtained. Exemplified metal of the shell is relatively expensive metal, and when the metal is used in combination with a relatively cheap metal as in the present invention, the cost may be economically reduced as compared to the case where the relatively expensive metal is used as single particles.

Since the part substantially exposed to the outside is the metal of the shell, it is possible to exhibit an effect equivalent to a level at which relatively expensive metal particles are used alone.

As an example of the core-shell structure of the present invention, the metal of the core may be zinc and the metal of the shell may be silver, but various core-shell metal combinations can be prepared without being limited to the above example.

The method for preparing the mesoporous silica embedded with alloy particles according to an exemplary embodiment of the present invention may include: 1) putting mesoporous silica in which the inside of mesopores is embedded with a first metal into water and mixing the silica with the water; 2) putting a second metal compound into the mixed solution and preparing the first metal in the mesopores into alloy particles having a core-shell structure through an oxidation-reduction reaction with the first metal; and 3) washing and drying the mesoporous silica.

According to the preparation method, step 1) is a step of putting mesoporous silica in which the inside of mesopores is embedded with first metal particles into water and mixing the silica with the water.

In order to prepare the mesoporous silica in which the inside of mesopores in step 1) is embedded with first metal particles, the method may include: a) putting alkylamine into a solvent and stirring the resulting solution; b) preparing a solution containing a first metal ion by putting the first metal compound into the solution in step a) and stirring the resulting solution; c) preparing mesoporous silica in which the inside of the mesopores is embedded with the first metal ion by putting a silica precursor into the solution containing the first metal ion and stirring the resulting solution; d) putting a reducing agent into the solution in step 3) and reducing the first metal ion; and e) washing and drying the mesoporous silica.

Step 1) is a step in which the inside of mesoporous silica is embedded with the first metal, and includes a step in which when the inside of mesoporous silica is embedded with a first metal ion by a gel-sol method, a reducing agent is then put thereinto, and the first metal ion is reduced to first metal particles.

More specifically, an amine-based template agent may be used in the alkylamine, and more specifically, the alkylamine is an alkyl amine having an alkyl group having 5 to 18 carbon atoms. More specifically, the alkyl amine is selected from the group consisting of dodecylamine, decylamine, tetradecylamine, and a mixture thereof, but is not limited to the above example.

The solvent is more specifically an aqueous alcohol solution, and the alcohol is selected from the group consisting of methyl alcohol, ethyl alcohol, propyl alcohol, butanol, and pentanol, and is preferably ethyl alcohol, but all of the alcohols can be used without being limited to the above example.

The aqueous alcohol solution is a mixture of 5 to 15 wt % of alcohol and 85 to 95 wt % of purified water. When the alcohol is included in an amount of less than 5 wt %, the amount of alcohol used is insufficient, so that there may be concern in that the alkylamine is not sufficiently dissolved, and when the content of alcohol is more than 10 wt %, the alkylamine is diluted in the alcohol, so that the overall reaction speed is decreased.

In order to prepare the solution, a gel forming agent is put into the solvent, and the resulting solution is stirred at 50 to 70° C. for 30 to 90 minutes until the solution becomes clear. Preferably, the solution is vigorously stirred at 60±1° C. for 60 minutes, and stirred at 15 to 25° C. for approximately 1 hour.

The solution is prepared by adding 15 to 25 ml of water and 1 to 5 ml of alcohol with respect to 1 mmol of the alkylamine. When the amount of aqueous alcohol solution added is less than the above-described range, there may be concern in that the alkylamine is not dissolved well, and as a result, the reaction is not conducted, and when the amount is more than the above-described range, there may be concern that the yield is reduced.

Thereafter, a first metal ion is allowed to be uniformly mixed in the solution prepared in step a) by putting a first metal compound into the solution and stirring the resulting mixture for 30 to 90 minutes. Preferably, a solution in which the first metal ion was uniformly mixed was prepared by using a magnetic bar for 60 minutes to stir the mixture.

The first metal compound may be included in the form of an aqueous solution in which the first metal compound selected from the group consisting of $Zn(NO_3)_2$, $ZnCl_2$, $ZnSO_4$, $Zn(OAc)_2$, $SnCl_2$, and $Sn(OAc)_2$ is uniformly dissolved in water.

A complex compound may be obtained by adding a first metal ion to a solution in which alkylamine is dissolved and stirring the resulting solution. For the amount of ion of the first metal added, it is preferred to add 4 to 5 ml of an aqueous first metal ion solution at a concentration of 0.1 mmol with respect to 1 mmol of alkylamine, but the amount is not limited to the example, and all the amounts can be used as long as the amount is within a range capable of preparing the complex compound.

Thereafter, mesoporous silica embedded with the first metal ion in mesopores is prepared by putting a silica precursor thereto and stirring the resulting solution.

Specifically, when a silica precursor is put into the gel solution and the resulting solution is stirred at room temperature which is 15 to 25° C., the silica precursor is gelled through self-assembly, and in this case, it is possible to prepare spherical mesoporous silica in a form in which the inside of mesopores is embedded with the first metal ion.

More specifically, when the silica precursor is added and the resulting solution is vigorously stirred for approximately 1 hour and stored in the static condition at room temperature which is 15 to 25° C. for 3 days, the silica precursor is gelled through a sol-gel reaction, and as a result, spherical mesoporous silica is formed.

The silica precursor may be selected from the group consisting of tetraethoxyorthosilicate (TEOS), tetramethoxyorthosilicate (TMOS), tetra(methylethylketoxime)silane, vinyl oxime silane (VOS), phenyl tris(butanone oxime) silane (POS), methyltriethoxysilane (MTES), methyltrimethoxysilane (MTMS), and a mixture thereof, but is preferably tetraethoxyorthosilicate (TEOS), but the silica precursor is not limited to the above example, and any material can be used without limitation.

The precursor may be added within a range of 4 to 10 mmol with respect to 1.0 mmol of alkylamine, but the concentration is not limited to the above range, and any concentration value can be used as long as spherical mesoporous silica may be formed through a sol-gel reaction. When the amount of silica precursor added is less than 4 mmol, the film thickness of the silica is so thin that there may be concern in that the stability of the structural body deteriorate, and when the amount of silica precursor is more than 10 mmol, the thickness of silica outer wall becomes so large that another structural body occurs, and thus, there may be concern in that the function of metal particles is inhibited.

The first metal with which the inside of the mesoporous silica is embedded embeds the silica in the form of an ion, so that in order to reduce the ion to the metal, a reducing agent is put thereinto, and the first metal ion is reduced.

The reducing agent may be selected from the group consisting of trisodium citrate, $NaBH_4$, phenylhydrazine.HCl, ascorbic acid, phenylhydrazine, $LiAlH_4$, $N_2H_4$, and hydrazine, but is preferably $NaBH_4$, but the reducing agent is not limited to the above example, and any reducing agent can be used without limitation.

The reducing agent may be added at 0.2 to 0.6 mol with respect to 1.0 mol of alkylamine, but the concentration value is not limited to the above range, and the reducing agent can be used without limitation. When the amount of reducing agent added is less than 0.2 mol, there may be concern in that the conversion rate into the first metal particles is reduced, and when the amount of reducing agent added is more than 0.6 mol, the conversion rate into the first metal particles is not remarkably increased, and the reducing agent may remain in excess in the gel solution.

The reducing agent is used as an aqueous $NaBH_4$ solution to reduce the first metal ion, and thus allows the inside of mesoporous silica to be embedded with the first metal.

Thereafter, a post-treatment process is performed. The post-treatment process prepares mesoporous silica in which mesopores are embedded with the first metal by performing vacuum-filtration, using distilled water and ethyl alcohol to wash mesoporous silica, and then drying the mesoporous silica.

More specifically, filtration is performed by a vacuum device, and then the remaining reducing agent is removed with distilled water, and the alkylamine remaining on the mesoporous silica is removed with heated alcohol, and the residue is dried.

Specifically, after the mesoporous silica embedded with the first metal is vacuum-filtered under a pressure of 10 to 50 mmHg, the remaining reducing agent is removed by using 200 to 300 ml of distilled water to wash the residue three to five times. Thereafter, the residue is washed three to five times using alcohol at 60±1° C. and dried at a temperature of 50±2° C. for 24 hours to prepare mesoporous silica embedded with the first metal.

The amount of alcohol used to remove the alkylamine is preferably 10 to 30 ml with respect to 1 mmol of alkylamine, and the alcohol may be selected from the group consisting of methyl alcohol, ethyl alcohol, propyl alcohol, butyl alcohol, and a mixture thereof. When the amount of alcohol added is less than 10 ml, the amount of alcohol used is insufficient, and thus alkylamine is not sufficiently dissolved, and as a result, the alkylamine may not be removed.

The amount of alcohol added is more than 30 ml, there is a concern in that the alkylamine is diluted in alcohol to cause a decrease in overall reaction speed, and simultaneously, it takes a lot of time to remove the alkylamine.

In addition to the alcohol, other organic solvents such as benzene, sectane and octane may be used.

As another method, the preparing of the mesoporous silica in which the inside of the mesopores is embedded with the first metal may include: a') putting alkylamine into a solvent and stirring the resulting solution; b') preparing a solution containing a first metal ion by putting the first metal compound into the solution in step a') and stirring the resulting solution; c') putting a reducing agent into the solution in step b') and reducing the first metal ion; d') preparing mesoporous silica in which the inside of the mesopores is embedded with the first metal by putting a silica precursor into the solution in which the first metal ion is reduced and stirring the resulting solution; and e') washing and drying the mesoporous silica.

That is, the first metal ion is first reduced by exchanging the sequence of the step described above with the sequence of steps c) and d), and then the reaction is performed with silication by mixing a silica precursor with the mesoporous silica. The specific description of each step has been described above, and thus will be omitted.

Mesoporous silica embedded with the first metal is prepared by the preparation method, and then put into water and mixed, and a second metal compound is put into the mixed solution and stirred to prepare embedded particles in mesopores into alloy particles having a core-shell structure through an oxidation reduction reaction with the first metal in mesopores.

In order to introduce the ion of the second metal, the second metal compound may be used, and a negative ion of the second metal compound may be nitric acid ($NO^{3-}$), sulfuric acid ($SO_4^{2-}$), a chloride ion ($Cl^-$), and the like, but is not limited to the above example.

More specifically, the second metal compound may be selected from the group consisting of $AgNO_3$, $CuCl_2$, $Pt(OAC)_2$, $PdCl_2$, $Au(OAc)_3$, and a mixture thereof, but is preferably $AgNO_3$, but the second metal compound is not limited to the above example, and can be used without limitation.

By mesoporous silica embedded with alloy particles and a preparation method thereof according to the present invention, it is possible to prevent the release of metal nanoparticles to the outside because the inside of spherical mesoporous silica is embedded with metal nanoparticles, and as the aggregation of the metal is prevented, the stability is excellent and the production yield is high during the preparation process, so that mesoporous silica can be mass-produced, the efficacy of metal nanoparticles may be maintained by preventing the oxidation of metal nanoparticles, and mesoporous silica can be produced at low costs.

The inside of pores of mesoporous silica is embedded with metal nanoparticles, so that the discoloration and smell change phenomenon does not occur, and the far-infrared emission and deodorization effects are excellent.

BRIEF DESCRIPTION OF THE DRAWINGS

FIG. 1 is a flowchart of the preparation method of mesoporous silica according to an exemplary embodiment of the present invention.

FIG. 2 is a flowchart of the preparation method of mesoporous silica according to an exemplary embodiment of the present invention.

FIG. 3 is a flowchart of the preparation method of mesoporous silica according to an exemplary embodiment of the present invention.

FIG. 4 is an SEM photograph of spherical mesoporous silica dispersed and embedded with alloy nanoparticles according to an exemplary embodiment of the present invention.

FIG. 5 is an SEM photograph of spherical mesoporous silica dispersed and embedded with alloy nanoparticles according to an exemplary embodiment of the present invention.

FIG. 6 is an SEM EDAX result of spherical mesoporous silica dispersed and embedded with alloy nanoparticles according to an exemplary embodiment of the present invention.

FIG. 7 is a TEM photograph of spherical mesoporous silica dispersed and embedded with alloy nanoparticles according to an exemplary embodiment of the present invention.

FIG. 8 is a TEM photograph of spherical mesoporous silica dispersed and embedded with alloy nanoparticles according to an exemplary embodiment of the present invention.

FIG. 9 is a TEM EDAX result of spherical mesoporous silica dispersed and embedded with alloy nanoparticles according to an exemplary embodiment of the present invention.

FIG. 10 is a TEM EDAX result of spherical mesoporous silica dispersed and embedded with alloy nanoparticles according to an exemplary embodiment of the present invention.

FIG. 11 is a result of a mapping for silver (Ag) element of spherical mesoporous silica dispersed and embedded with alloy nanoparticles according to an embodiment of the present invention.

FIG. 12 is a result of a mapping for zinc (Zn) element of spherical mesoporous silica dispersed and embedded with alloy nanoparticles according to an embodiment of the present invention.

FIG. 13 is a result of a mapping for oxygen (O) element of spherical mesoporous silica dispersed and embedded with alloy nanoparticles according to an embodiment of the present invention.

FIG. 14 is a result of a mapping for silicon (Si) element of spherical mesoporous silica dispersed and embedded with alloy nanoparticles according to an embodiment of the present invention.

FIG. 15 is a result of a mapping for carbon (C) element of spherical mesoporous silica dispersed and embedded with alloy nanoparticles according to an embodiment of the present invention.

FIG. 16 is a result of a mapping for nitrogen (N) element of spherical mesoporous silica dispersed and embedded with alloy nanoparticles according to an embodiment of the present invention.

DETAILED DESCRIPTION

Hereinafter, the Examples of the present invention will be described in detail such that a person skilled in the art to which the present invention pertains can easily carry out the present invention. However, the present invention can be implemented in various different forms, and is not limited to the Examples described herein.

Preparation Example 1

Preparation of spherical mesoporous silica including first metal After 1 mmol dodecylamine (DDA) was added to 20 mL of an aqueous ethyl alcohol solution at a concentration of 10%, the resulting solution was stirred at a temperature of 60±1° C. for 1 hour until the aqueous ethyl alcohol solution became clear, and then maintained while being stirred at room temperature for approximately 1 hour.

Thereafter, 5 ml of an aqueous solution containing a first metal ion was added thereto as in the following Table 1, and then the resulting solution was stirred with a magnetic bar for approximately 1 hour.

After 4 mmol tetraethoxyorthosilicate (TEOS) as a silica precursor was added thereto, spherical mesoporous silica in which the inside of the wall of mesopores was embedded with the first metal ion was prepared by vigorously stirring the resulting solution at room temperature for approximately 1 hour. After a first metal ion was reduced by adding 0.2 mmol $NaBH_4$ as a reducing agent thereto and vacuum-filtration was performed under a pressure of 30 mmHg, the resulting product was washed three times using 200 ml of distilled water, and then washed three times using 100 ml of ethyl alcohol at 60° C., and dried at a temperature of 50±2° C. for 24 hours, thereby preparing mesoporous silica in which the inside of the wall of mesopores was embedded with the first metal.

TABLE 1

| Classification | First metal compound | Content in aqueous solution (molar concentration) |
|---|---|---|
| Example 1-1 | $Zn(NO_3)_2$ | 0.1 |
| Example 1-2 | $ZnCl_2$ | 0.1 |
| Example 1-3 | $ZnSO_4$ | 0.1 |
| Example 1-4 | $Zn(OAc)_2$ | 0.1 |
| Example 1-5 | $SnCl_2$ | 0.1 |
| Example 1-6 | $Sn(OAc)_2$ | 0.1 |

Preparation Example 2

Preparation of Spherical Mesoporous Silica Including First Metal

After a gel solution was obtained by forming an aqueous first metal ion complex compound solution as in Example 1, a first metal ion was reduced by adding 0.2 mmol $NaBH_4$ as a reducing agent thereto. Thereafter, after 4 mmol tetraethoxyorthosilicate (TEOS) as a silica precursor was added thereto, spherical mesoporous silica was obtained by vigorously stirring the resulting solution at room temperature for 1 hour, and then vacuum-filtration was performed at a pressure of 30 mmHg, the resulting product was washed three times using 200 ml of distilled water and washed three times using 100 ml of ethyl alcohol at 60° C., and then dried at a temperature of 50±2° C. for 24 hours, thereby preparing mesoporous silica in which the inside of the wall of pores was embedded with the first metal.

Preparation Example 3

Preparation of Spherical Mesoporous Silica in which Inside of Wall of Pores Contains Alloy Particles An oxidation-reduction reaction with a first metal was performed by putting the second metal compound in the following Table 2 into an aqueous solution in which the spherical mesoporous silica embedded with the first metal prepared in Example 1-1 (Examples 3-5 and 3-6 were separately prepared by the method of Example 1) was put into water and stirring the resulting solution at room temperature for 1 hour.

After the reaction was terminated, the resulting product was vacuum-filtered under a pressure of 30 mmHg, washed three times using 200 ml of distilled water, washed three times using 100 ml of ethyl alcohol at 60° C., and then dried at a temperature of 50±2° C. for 24 hours, thereby preparing spherical mesoporous silica in which the inside of mesopores was embedded with alloy particles having a core-shell structure of a first metal and a second metal.

TABLE 2

| Classification | First metal | Second metal compound | Content (molar concentration) of second metal compound in aqueous solution |
|---|---|---|---|
| Example 3-1 | Zn | AgNO$_3$ | 0.1 |
| Example 3-2 | Zn | CuCl$_2$ | 0.1 |
| Example 3-3 | Zn | Pt(OAC)$_2$ | 0.1 |
| Example 3-4 | Sn | PdCl$_2$ | 0.1 |
| Example 3-5 | Sn | AgNO$_3$ | 0.1 |
| Example 3-6 | Cu | Au(OAc)$_3$ | 0.1 |

The SEM photographs of the spherical mesoporous silica dispersed and embedded with nano-sized alloy particles in Example 3-1 are as illustrated in FIGS. 4 and 5.

According to FIGS. 4 and 5, it can be confirmed that the spherical mesoporous silica is very uniformly standardized as a whole. The spherical mesoporous silica dispersed and embedded with nano-sized alloy particles has a particle size of 20 to 700 nm.

The TEM photograph results of the spherical mesoporous silica dispersed and embedded with nan-sized alloy particles in Example 3-1 are as illustrated in FIGS. 6 and 7.

According to FIGS. 6 and 7, it can be confirmed that nano-sized alloy particles are uniformly dispersed in the spherical mesoporous silica as a whole. It was confirmed that the size of alloy particles was exhibited as a black dot of 1 to 3 nm, and in FIGS. 11 to 16 mapping the same, it can be confirmed that silver, zinc, silicon, oxygen, carbon, and nitrogen are uniformly dispersed.

Although the preferred Examples of the present invention have been described in detail hereinabove, the right scope of the present invention is not limited thereto, and it should be understood that many variations and modifications of those skilled in the art using the basic concept of the present invention, which is defined in the following claims, will also fall within the right scope of the present invention.

What is claimed is:

1. Mesoporous silica embedded with core-shell particles, wherein each of the core-shell particles comprises an inner core and an outer shell and the inner core and the outer shell constitute different metal particles.

2. The mesoporous silica of claim 1, wherein the mesoporous silica is spherical.

3. The mesoporous silica of claim 1, wherein the metal particle of the inner core has a higher ionization energy than the metal particle of the outer shell.

4. The mesoporous silica of claim 3, wherein the metal particle of the inner core is selected from the group consisting of lithium (Li), magnesium (Mg), aluminum (Al), manganese (Mn), zinc (Zn), chromium (Cr), iron (Fe), cobalt (Co), nickel (Ni), tin (Sn), and a mixture thereof.

5. The mesoporous silica of claim 3, wherein the metal particle of the outer shell is selected from the group consisting of copper (Cu), silver (Ag), platinum (Pt), palladium (Pd), and a mixture thereof.

6. A method for preparing mesoporous silica embedded with alloy particles, the method comprising:
   1) putting mesoporous silica in which the inside of mesopores is embedded with a first metal into water and mixing the silica with the water;
   2) putting a second metal compound into the mixed solution and preparing the first metal in the mesopores into alloy particles having a core-shell structure through an oxidation-reduction reaction with the first metal; and
   3) washing and drying the mesoporous silica.

7. The method of claim 6, wherein the preparing of the mesoporous silica in which the inside of mesopores is embedded with the first metal comprises:
   a) putting alkylamine into a solvent and stirring the resulting solution;
   b) preparing a solution containing a first metal ion by putting the first metal compound into the solution in step a) and stirring the resulting solution;
   c) preparing mesoporous silica in which the inside of the mesopores is embedded with the first metal ion by putting a silica precursor into the solution containing the first metal ion and stirring the resulting solution;
   d) putting a reducing agent into the solution in step c) and reducing the first metal ion; and
   e) washing and drying the mesoporous silica.

8. The method of claim 6, wherein the preparing of the mesoporous silica in which the inside of mesopores is embedded with the first metal comprises:
   a') putting alkylamine into a solvent and stirring the resulting solution;
   b') preparing a solution containing a first metal ion by putting the first metal compound into the solution in step a') and stirring the resulting solution;
   c') putting a reducing agent into the solution in step b') and reducing the first metal ion;
   d') preparing mesoporous silica in which the inside of the mesopores is embedded with the first metal by putting a silica precursor into the solution in which the first metal ion is reduced and stirring the resulting solution; and
   e') washing and drying the mesoporous silica.

9. The method of claim 6, wherein the first metal is selected from the group consisting of lithium (Li), magnesium (Mg), aluminum (Al), manganese (Mn), zinc (Zn), chromium (Cr), iron (Fe), cobalt (Co), nickel (Ni), tin (Sn), and a mixture thereof.

10. The method of claim 6, wherein the second metal compound is selected from the group consisting of AgNO$_3$, CuCl$_2$, Pt(OAC)$_2$, PdCl$_2$, Au(OAc)$_3$, and a mixture thereof.

* * * * *